United States Patent [19]

McDonald

[11] 4,021,393

[45] May 3, 1977

[54] METHOD AND COMPOSITION FOR SURFACING AND REPAIRING BROKEN PAVEMENTS WITH AN ELASTOMERIC MATERIAL HAVING IMPROVED FLEXING PROPERTIES AT FREEZING TEMPERATURES WITHOUT ANY SIGNIFICANT LOSS OF VISCOSITY AT HIGH APPLICATION TEMPERATURES

[76] Inventor: Charles H. McDonald, 3130 W. Pierce St., Phoenix, Ariz. 85009

[22] Filed: Oct. 14, 1975

[21] Appl. No.: 622,143

[52] U.S. Cl. .................... 260/28.5 AS; 106/273 R; 404/72; 404/82
[51] Int. Cl.² ........................................ C08L 95/00
[58] Field of Search ......... 260/28.5 AS; 106/273 R; 404/72, 82

[56] References Cited

UNITED STATES PATENTS

| | | | |
|---|---|---|---|
| 3,763,074 | 10/1973 | Rostler | 260/28.5 AS |
| 3,844,688 | 10/1974 | Bulkley et al. | 417/313 |
| 3,891,855 | 6/1975 | Offermann | 250/440 |
| 3,919,148 | 11/1975 | Winters et al. | 260/28.5 AS |

*Primary Examiner*—Melvyn I. Marquis
*Attorney, Agent, or Firm*—Harris, Kern, Wallen & Tinsley

[57] ABSTRACT

A method and material is provided for surfacing and repairing broken pavements with an elastomeric paving material comprised of the reaction product between a paving grade asphalt and a non-oil resistant rubber having petroleum malthenes admixed with said reaction product to improve the flexing properties at freezing temperatures of said paving material without any significant loss of viscosity at the high temperatures of application.

9 Claims, No Drawings

METHOD AND COMPOSITION FOR SURFACING AND REPAIRING BROKEN PAVEMENTS WITH AN ELASTOMERIC MATERIAL HAVING IMPROVED FLEXING PROPERTIES AT FREEZING TEMPERATURES WITHOUT ANY SIGNIFICANT LOSS OF VISCOSITY AT HIGH APPLICATION TEMPERATURES

BACKGROUND OF THE INVENTION

U.S. Pats. Nos. 3,844,668 and 3,891,585 disclose new paving compositions generally comprised of the reaction product between asphalt and a non-oil resistant rubber. These new paving compositions are a significant improvement over prior paving materials and constitute a new use for hitherto unwanted scrap rubber, such as old tires.

These new compositions, however, are not as flexible as desired at ambient freezing temperatures and are sometimes susceptable to cracking when subjected to the stress of vehicular traffic at such freezing temperatures. This low temperature susceptability to cracking can be improved by admixing conventional solvents or diluents, such as kerosene, with said paving compositions. However, the addition of such solvents will correspondingly lower the viscosity of the compositions to a degree where stone aggregate, which is normally used to cover the composition after application to the pavement, may be stripped from the composition by the movement of vehicular traffic with the result that such compositions will no longer have the ability to withstand the wear and tear of traffic.

SUMMARY OF THE INVENTION

I have made the suprising discovery that the addition of malthenes, also known as maltenes, to the aphalt-rubber reaction product will yield improved flexing properties at ambient freezing temperatures without any significant loss of viscosity of the asphalt-rubber reaction product at the high temperatures of application to the pavement, and in some instances, will result in an increase in said viscosity. This is surprising and contrary to what would be expected.

PREFERRED EMBODIMENTS OF THE INVENTION

Malthenes are defined by Hackh's Chemical Dictionary, 4th Edition (1969), as petrolenes which are defined as the oily or soft constituent of bitumen which is soluble in petroleum spirits. Petroleum spirits are defined by said Dictionary as ligrion which is defined as a solvent comprising the fourth fraction from the distillation of petroleum having a density at room temperature of 0.7 to 0.722 and a boiling point of 90° C to 120° C.

The malthenes may be mixed with the asphalt-rubber mixture either before or during the reaction to form the asphalt-rubber reaction product, or the malthenes may be mixed with the reaction product itself, or with either the asphalt or the rubber prior to mixing. The asphalt-rubber mixture generally contains from about 15 to about 35 weight percent of vulcanized or partially devulcanized ground rubber and about 65 to about 85 weight percent of asphalt. The mixture is generally reacted at about 300° F to about 500° F until the formation of a jellied composition which comprises said new paving material.

The malthenes are admixed as aforesaid in amounts between about 3 to about 20 weight percent of the total asphalt-rubber malthene mixture. Amounts of malthenes between about 3 to about 10 percent by weight of said mixture do not result in any substantial loss in viscosity of said reaction product at elevated temperatures in the range of about 100° to about 400° F when admixed as aforesaid, and have even resulted in an increase in said viscosity. Amounts of malthenes ranging from about 10 to about 20 percent by weight of said mixture result in a slight loss in viscosity of said reaction product at said elevated temperatures when admixed as aforesaid, but not as much as equivalent amounts of other diluents, such as kerosene. Malthenes in the amounts between about 5 to about 10 percent by weight of said mixture are preferred to be admixed as aforesaid because the reaction product having said amounts exhibit essentially practically the same viscosity characteristics at application temperatures as the reaction product without malthenes, and because the reaction product having said malthenes exhibits more favorable flexing properties at lower temperatures such as between about 40° F to about −10° F. Where the reaction product has a solvent such as kerosene admixed therewith in amounts which would be used in actual practice, the reaction product will exhibit percentage drops in viscosities which are at least about two to about four times lower than the viscosities of reaction products having corresponding amounts of malthenes admixed therewith.

To demonstrate the comparative effect of malthenes and kerosene upon the viscosity and flexibility of said asphalt-rubber reaction products eleven examples of an asphalt-rubber mixture were prepared and reacted as follows. Los Angeles Basin asphalt, grade AR-1000 was heated and admixed with tire peel ground to a size that will pass a No. 16 U.S. Standard screen and be retained on a No. 25 U.S. Standard screen, except where otherwise noted. The rubber was added in amounts so that the ratio of rubber to asphalt was 1 to 3 in each example except as otherwise noted. Viscosity measurements in centipoises were taken after the asphalt-rubber reaction product was formed and after the malthenes or kerosene was added thereto. All viscosity measurements were made at 300° F which is a common application temperature. The source of the malthenes was crude oil from the Four Corners area of Colorado, Utah, New Mexico, and Arizona. This crude oil consists essentially of malthenes with minor amounts of gasolines and napthas and other volatiles that boil off below 400° F, and contains virtually no asphaltenes.

Each example is described hereinafter, and the comparative viscosity measurements are reported in Table I.

EXAMPLE 1

The asphalt and rubber were heated to about 400° F until a jellied reaction product resulted. Kerosene was admixed therewith to form a mixture containing 4.8 weight percent of kerosene.

EXAMPLE 2

The asphalt and rubber were heated to 300° F until a jellied reaction product was formed. Kerosene was admixed therewith to form a mixture containing 4.8 weight percent of kerosene.

EXAMPLE 3

This batch was prepared in the same manner as in Example 1 except that 5.3 weight percent of malthenes were substituted for 4.8 weight percent of kerosene. This weight percent of malthenes is the weight percent remaining after the loss of 24% of volatile materials from the malthenes which occurred during admixing with the hot reaction product at 400° F.

EXAMPLE 4

This batch was prepared in the same manner as in Example 2 except that no diluent was added. This example serves as the control or basis of comparison for the following Examples 5, 6, 7, and 8.

EXAMPLE 5

This batch was prepared by first presoaking the rubber with malthenes in the amount 22.5 weight percent of the final reaction product. This weight percent of malthenes is the weight percent remaining after the loss of 5% of the volatiles from the malthenes which occurred during admixing at 300° F.

EXAMPLE 6

This batch was prepared as in Example 5 except that 6.5 weight percent of malthenes were used (after the loss of 5% of volatiles as in Example 5) to presoak the rubber rather than the 22.5% of malthenes in Example 5.

EXAMPLE 7

This batch was prepared as in Example 5 except that 7.9% of Reclamite was used to presoak the rubber in place of 22.5% of malthenes. Reclamite is a trade name for a malthene-water emulsion, having about 30 to 35 weight percent of water, manufactured by the Golden Bear Oil Company of Bakersfield, Calif. The 7.9% of Reclamite is the malthene residue remaining after the water content evaporated.

EXAMPLE 8

This batch was prepared in the same manner as in Example 7 except that 4.1% of the malthene residue of Reclamite was used in place of 7.9% of malthene residue.

EXAMPLE 9

The materials of this batch differ from those used in the prior batches in that the ground rubber was dust which passed a No. 100 U.S. Standard sieve screen and the rubber content was 25% of the total asphalt-rubber mixture. The batch was prepared by heating the asphalt separately to about 500° F and then adding the rubber. The mixture was cooled to 270° F and then maintained at that temperature until the reaction product was formed. No diluents were added to this example which served as the control for following Examples 10 and 11.

EXAMPLE 10

This batch was prepared in the same manner as in Example 9 except that the asphalt-rubber ratio was 1 to 1, and the mixture was heated to 250 ° F at which time malthenes were admixed therewith in the amount of 48.7 weight percent of the total asphalt-rubber-malthene mixture. The mixture was then heated to about 300° F until a rubber reaction product was formed. The weight percent of malthene used herein is the weight percent remaining after the loss of 5% of the volatiles from the malthenes during the heating to 300° F.

EXAMPLE 11

This batch was prepared in the same manner as set forth in Example 10 except that 48.7 percent of kerosene was substituted for the malthenes.

TABLE I

| Ex. | Viscosity of Example Before Dilution | Diluent Admixed With Example | Viscosity of Example After Dilution | % Viscosity Drop Corrected to 4.8% of Diluent |
|---|---|---|---|---|
| 1 | 13,000 | 4.8% Kerosene | 4,200 | 67 |
| 2 | 4,600 | 4.8% Kerosene | 2,400 | 48 |
| 3 | 11,000 | 5.3% Malthenes | 8,500 | 22 |
| 4 | 2,700 | 0 | — | — |
| 5 | 2,700 | 22.5% Malthenes | 620 | 17 |
| 6 | 2,700 | 6.5% Malthenes | 3,700 | +27 |
| 7 | 2,700 | 7.9% Reclamite | 1.800 | 20 |
| 8 | 2,700 | 4.1% Reclamite | 3,850 | +50 |
| 9 | 19,000 | 0 | — | — |
| 10 | 19,000 | 48.7% Malthenes | 10,500 | 4.4 |
| 11 | 19,000 | 48.7% Kerosene | 8,000 | 5.7 |

The column in Table I entitled "Percentage Viscosity Drop Due to Diluent" is corrected to 4.8 weight percent of diluent for Examples 3, 5 to 8 and 10 and 11, to provide a common basis of comparison against kerosene. To make this correction, the weight percent of diluent actually used was divided by 4.8 which yielded a factor which was divided into the percentage of viscosity drop to yield the corrected figures in the column "Percentage Viscosity Drop Due to Diluent." The plus (+) figures in this column indicate a surprising increase in viscosity.

The data set forth in Table I demonstrates that for commercially acceptable asphlat-rubber compositions, as characterized by Examples 1 through 8, the drop in viscosity resulting from kerosene dilution is at least three times as much and is generally much more than any drop in viscosity from using an equivalent amount of malthenes even though, for example, the viscosity of the kerosene and the malthenes used in the examples are almost identical and would be expected to have comparable effect on the high temperature viscosity of the asphalt-rubber composition. This minimal affect of the malthene diluent on the high temperature viscosity will permit stone cover aggregate placed over the hot asphalt-rubber composition to withstand the disruptive effects of vehicular traffic. The resultant improvement in low temperature susceptibility to cracking under flexing stresses at below freezing temperatures afforded by malthenes can therefore be obtained without significant loss of viscosity at high temperatures.

Examples 9 to 11 represent an extreme formulation to test the outside limits of applicant's discovery, and do not represent a formulation that would be used in street surfacing applications. In spite of this, Examples 9 to 11 still show that the viscosity drop of the high kerosene dilution is greater than that of the malthene dilution. The diluents in Examples 9 to 11 constitute 48.7% of the total composition and, since the kerosene and the malthenes used in the examples have approximately the same viscosity, the viscosity differences in Example 9 to 11 would tend to disappear as the diluent content was increased to 100%

Specimens from each example were tested for cold temperature flexibility and resistance to cracking as follows. Specimens from each example were fabricated on index cards into solid strips which were 4½ inches in length, 1 inch in width, and 1/8 inch in thickness. Each specimen, after refrigeration to specified temperatures, was placed on top of two 1/8 inch thick spacers positioned 1½ inches apart to form a bridge between the spacers. The spacers were resting upon a solid base. Each specimen was placed over the bridge with the index card resting on the spacers. An 1/8 inch diameter mandril having a constant weight of 551.6 grams was applied to each specimen at the middle of the bridge at a speed of 2.25 feet per second. The specimens were deflected downwardly by the dynamic weight applied to the mandril. If cracks appeared in the specimens after deflection, they were considered to have failed (F). If no cracks appeared, the specimens were considered not to have failed (NF). The results of said deflection tests on specimens fabricated from the Examples 1 to 11 are reported in Table II.

TABLE II

| Temp. °F | Example 4, no diluent added | Example 1, 4.8% Kerosene | Example 3, 5.3% Malthenes | Example 5, 22.5% Malthenes | Example 6, 6.5% Malthenes | Example 7, 7.9% Reclamite | Example 8, 4.1% Reclamite | Example 10, 48.7% Malthenes |
|---|---|---|---|---|---|---|---|---|
| 40 | | | | | | | | |
| 34 | 4F | | | | | | | |
| 30 | 4F | | | | | | 4NF | |
| 28 | | 1NF | 4NF | | | | | |
| 16 | | 1F, 1NF | | | | | | |
| 14 | | | | | 4NF | | | |
| 10 | | 1F | 3 NF, 1F | 4NF | | | | |
| 5 | | | | | | 3NF, 1F | | 4NF |
| 4 | | | | | 4NF | | 1F, 3NF | |
| 2 | | | 1NF, 1F | | | | | |
| 0 | | | | | | 3F | 1F | |
| −8 | | | | | 4NF | | | |
| −10 | | | | 4NF | 2NF, 1F | | | 4NF |

The data set forth in Table II demonstrates that the addition of malthenes to asphalt-rubber compositions significantly improves the susceptability of such compositions to cracking at low temperatures under the deflections created by traffic wheel loads.

The use of malthenes as aforesaid is not limited to the particular weight percentages of asphalt and rubber as disclosed in U.S. Pats. Nos. 3,844,668 and 3,891,585, but covers jelliedasphalt-rubber reaction products of any proportion which are suitable for use as a paving or repair material.

The use of malthens as described herein may also be used with thixotropic aqueous emulsions of said asphalt-rubber reaction products which are capable of flowing as a liquid upon gentle agitation. Such emulsions are described in my copending application Ser. No. 584,478, filed June 6, 1975, which is incoprorated by reference herein, and are generally formed by admixing said reaction product with an asphalt-rubber soap consisting essentially of water, an anionic water soluble emulsifying agent such as the soap of a vinsol resin and a lignin salt or a lignin sulfonate, a thickener such as boiled corn starch or methyl cellulose, and a halide of an alkali metal or an alkaline earth metal.

While the embodiment of the invention chosen herein for purposes of disclosure is at present to be considered preferred, it is to be understood that this invention is intended to cover all changes and modifications in the disclosed embodiments which fall within the spirit and scope of the invention.

I claim:

1. An elastomeric paving material prepared by reacting a mixture comprised of paving grade asphalt and non-oil resistant rubber, said paving material containing a malthene in an amount of about 3 to about 20 weight percent of said asphalt-rubber-malthene mixture, whereby said paving material exhibits improved low temperature flexing properties without any significant loss of viscosity at elevated temperatures used to apply said paving material to pavement.

2. A paving material set forth in claim 1 wherein said malthene comprises about 3 to about 10 weight percent of said mixture.

3. A paving material set forth in claim 1 wherein said malthene comprises about 10 to about 20 weight percent of said mixture.

4. A paving material set forth in claim 1 wherein said malthene comprises about 5 to about 10 weight percent of said mixture.

5. A paving material set forth in claim 1 wherin said mixture of paving material and malthenes is emulsified with water and an asphalt-rubber soap to produce a thixotropic emulsion capable of flowing as a liquid upon gentle agitation.

6. In a method for surfacing pavement and repairing broken pavement with an elastomeric paving material comprised of the reaction product of a mixture of paving grade asphalt and a non-oil resistant rubber, the improvement comprising the step of admixing a malthene with said asphalt-rubber reaction product in an amount of about 3 to about 20 weight percent of said asphalt-rubber-malthene mixture, whereby said paving material exhibits improved low temperature flexing properties without any significant loss of viscosity at elevated temperatures used to apply said paving material to pavement.

7. In a method as set forth in claim 6 wherein said malthenes comprise about 3 to about 10 weight percent of said mixture.

8. In a method as set forth in claim 6 wherein said malthenes comprise about 10 to about 20 weight percent of said mixture.

9. In a method as set forth in claim 6 wherein said malthenes comprise about 5 to about 10 weight percent of said mixture.

* * * * *